United States Patent
Jablokov et al.

(10) Patent No.: US 9,928,672 B2
(45) Date of Patent: Mar. 27, 2018

(54) SYSTEM AND METHOD OF MONITORING AND CONTROLLING APPLIANCES AND POWERED DEVICES USING RADIO-ENABLED PROXIMITY SENSING

(71) Applicant: Wallflower Labs Inc., Charlestown, MA (US)

(72) Inventors: Victor Roman Jablokov, Winchester, MA (US); Tommy Pinchuk, Wrentham, MA (US)

(73) Assignee: Wallflower Labs Inc., Charlestown, MA (US)

( * ) Notice: Subject to any disclaimer, the term of this patent is extended or adjusted under 35 U.S.C. 154(b) by 0 days.

(21) Appl. No.: 14/553,729

(22) Filed: Nov. 25, 2014

(65) Prior Publication Data

US 2015/0161835 A1    Jun. 11, 2015

Related U.S. Application Data

(60) Provisional application No. 61/912,415, filed on Dec. 5, 2013.

(51) Int. Cl.
*G05B 19/00* (2006.01)
*G05B 23/00* (2006.01)
(Continued)

(52) U.S. Cl.
CPC .......... *G07C 9/00111* (2013.01); *G08C 17/02* (2013.01); *H04Q 9/00* (2013.01); *H04Q 2209/40* (2013.01)

(58) Field of Classification Search
CPC ........ G07C 9/00111; G07C 2009/0038; G07C 2209/64; G08B 13/2462; H04Q 2209/47; H04Q 9/00; G08C 2201/91; G08C 2201/70; G08C 2201/92; G08C 19/00; G08C 2201/30; G08C 2201/32; G08C 17/00; G08C 2201/93; G08C 19/16; G08C 17/04;
(Continued)

(56) References Cited

U.S. PATENT DOCUMENTS 5,552,806 A *  9/1996  Lenchik ............ H04M 1/72533
                                                             345/156
6,130,413 A    10/2000  Rak
(Continued)

FOREIGN PATENT DOCUMENTS

CA        2193533 A1    6/1998
CA        2365921 A1    9/2000

OTHER PUBLICATIONS

Stove Guard International Ltd. Guardian 2010 Model—Aug. 2011. Installation & Operating Manual. Aug. 2011. Downloaded from https://www.stoveguardintl.com/wp-content/uploads/2015/07/GDN-2010-Aug-2011-Basic.pdf.
(Continued)

*Primary Examiner* — Emily C Terrell
(74) *Attorney, Agent, or Firm* — Pierce Atwood LLP

(57) ABSTRACT

A system and method of monitoring and controlling powered gas or electric appliances or devices using proximity awareness and providing optional watchdog safety shutoff capabilities including an inline or remote monitor and control system, radio awareness of compatible components such as Bluetooth smartphones and dongles, and optional Internet connectivity for remote monitoring, control, and usage data accumulation.

22 Claims, 9 Drawing Sheets

(51) Int. Cl.
*G06F 7/00* (2006.01)
*G06F 7/04* (2006.01)
*G06K 19/00* (2006.01)
*G08B 29/00* (2006.01)
*G08C 19/00* (2006.01)
*H04B 1/00* (2006.01)
*H04B 1/38* (2015.01)
*H04B 3/00* (2006.01)
*H04Q 1/00* (2006.01)
*H04Q 9/00* (2006.01)
*G07C 9/00* (2006.01)
*G08C 17/02* (2006.01)

(58) Field of Classification Search
CPC .... G08C 2201/71; H04W 4/04; H04W 64/00; H04W 4/008; H04M 1/72533; H04N 21/4126; H04N 2005/4428; H04N 21/43615; H04N 5/4403; H04B 5/02; H04B 5/0031; H04B 5/0062; H04B 1/202; F24F 11/0034; F24F 11/0086
USPC ....... 340/5.61–5.64, 10.1–10.5, 12.22–12.55
See application file for complete search history.

(56) References Cited

U.S. PATENT DOCUMENTS

| | | | |
|---|---|---|---|
| 6,189,105 B1 | 2/2001 | Lopes | |
| 6,563,430 B1* | 5/2003 | Kemink | H04N 21/42202 340/12.22 |
| 8,350,697 B2* | 1/2013 | Trundle | F24F 11/0086 340/539.26 |
| 8,396,452 B1 | 3/2013 | Matsuoka | |
| 8,497,796 B2* | 7/2013 | Shamilian | H04M 1/72533 340/3.71 |
| 8,527,908 B2 | 9/2013 | Pance et al. | |
| 8,595,810 B1 | 11/2013 | Ben Ayed | |
| 8,725,113 B2 | 5/2014 | Gargi et al. | |
| 8,836,522 B2 | 9/2014 | Thorpe et al. | |
| 2001/0052858 A1* | 12/2001 | Vincent | G05B 19/042 340/12.25 |
| 2005/0109333 A1* | 5/2005 | Thomas | F24C 7/082 126/42 |
| 2007/0171091 A1* | 7/2007 | Nisenboim | G08C 17/00 340/12.24 |
| 2007/0177744 A1 | 8/2007 | Kirn | |
| 2008/0105134 A1* | 5/2008 | Elston, III | G04R 20/26 99/325 |
| 2008/0231468 A1 | 9/2008 | Myllymaki | |
| 2009/0017404 A1* | 1/2009 | White | F24C 3/12 431/12 |
| 2009/0085754 A1 | 4/2009 | Myllymaki | |
| 2009/0160764 A1 | 6/2009 | Myllymaki | |
| 2009/0312883 A1 | 12/2009 | Myllymaki | |
| 2010/0066507 A1 | 3/2010 | Myllymaki | |
| 2010/0141437 A1 | 6/2010 | Karam et al. | |
| 2010/0216507 A1 | 8/2010 | Maeda | |
| 2011/0006789 A1 | 1/2011 | Cooper et al. | |
| 2011/0309933 A1* | 12/2011 | Marino | G01S 5/0252 340/539.32 |
| 2011/0314539 A1 | 12/2011 | Horton | |
| 2012/0044074 A1 | 2/2012 | Mulla | |
| 2012/0097662 A1* | 4/2012 | Ewell, Jr. | H05B 1/0252 219/492 |
| 2012/0132635 A1* | 5/2012 | Mishra | F24C 7/083 219/209 |
| 2012/0229258 A1 | 9/2012 | Lim et al. | |
| 2013/0094668 A1 | 4/2013 | Poulsen et al. | |
| 2013/0300534 A1 | 11/2013 | Myllymaki | |
| 2014/0035748 A1 | 2/2014 | Mulla | |
| 2014/0062678 A1* | 3/2014 | de Clercq | G05B 15/02 340/12.5 |
| 2014/0070927 A1 | 3/2014 | Broniak et al. | |
| 2014/0159859 A1 | 6/2014 | Karam et al. | |
| 2014/0163751 A1* | 6/2014 | Davis | H04L 12/12 700/286 |
| 2014/0198937 A1 | 7/2014 | Sacha et al. | |
| 2014/0199981 A1 | 7/2014 | Caley et al. | |
| 2014/0201256 A1 | 7/2014 | Pinheiro et al. | |
| 2014/0251987 A1* | 9/2014 | Reay | H05B 6/6447 219/756 |
| 2014/0375144 A1 | 12/2014 | Thorpe et al. | |
| 2015/0196161 A1 | 7/2015 | Myllymaki | |

OTHER PUBLICATIONS

Stove Guard International Ltd. Guardian 2010 Cooktop Model—Aug. 2011. Installation & Operating Manual. Aug. 2011. Downloaded from https://www.stoveguardintl.com/wp-content/uploads/2015/07/Cooktop-Manual.pdf.

Stove Guard. "Stove Guard—Introduction Part 1." Online video clip. YouTube, Jul. 21, 2010. Downloaded from https://www.youtube.com/watch?v=OBPdU8YuXEs.

Stove Guard. "Stove Guard—Introduction Part 2." Online video clip. YouTube, Jul. 22, 2010. Downloaded from https://www.youtube.com/watch?v=Wdn-YXKi6W8.

Bill Ferguson. "iGuardStove video." Online video clip. YouTube, Apr. 9, 2014. Downloaded from https://www.youtube.com/watch?v=0kpGzTQuN5k.

Bill Ferguson. "iGuardStove Internet." Online video clip. YouTube, Apr. 9, 2014. Downloaded from https://www.youtube.com/watch?v=9FtHi5QJGf4.

* cited by examiner

SYSTEM AND METHOD OF MONITORING AND CONTROLLING APPLIANCES AND POWERED DEVICES USING RADIO-ENABLED PROXIMITY SENSING

CROSS-REFERENCE TO RELATED APPLICATIONS

This application claims priority to and the benefit of U.S. Provisional Patent Application No. 61/912,415 filed on Dec. 5, 2013, which is incorporated herein in its entirety by reference.

FIELD OF THE INVENTION

The present invention relates generally to control of utility devices, and, in particular, to sensing the proximity and identity of a radio-enabled component such as a wearable dongle or smartphone, enabling simple or logical control of an electric, natural gas, geothermal, solar, gasoline or propane powered device, and the capturing usage data generated by such devices.

BACKGROUND OF THE INVENTION

WiFi, Zigbee, Z-Wave, NFC, RFID or low power and Bluetooth technologies are commonly used to communicate between two or more components. Advantageously, such communication means may be used to identify if a radio-enabled, compatible component, e.g., a cellular telephone, personal digital assistant, smartphone, tablet computer, and so forth, is within a pre-determined range of an appliance or powered device. Moreover, such devices can be used to control the supply of power, e.g., natural gas, propane, electricity, and the like, to the appliance or powered device, to shut-off, control or otherwise disable the appliance or powered device. Advantageously, it would be desirable to use external sensors, e.g., third-party home automation systems, to trigger events such as shutting down or off the system in an emergency.

It would also be desirable for, as users interact with the system, collecting, storing, and transferring data such as frequency of use, length of time of use or emergency remote shutoff initiated by the user or the system, to commercial customers, e.g., via API or other web- or cloud-based services for proprietary calculations, e.g., user's fire risk, usage modifications and associated insurance premiums.

SUMMARY OF THE INVENTION

A method of monitoring and controlling an appliance or powered device (referred to throughout as an "appliance") is disclosed in a first aspect of the present invention. In some embodiments, the method includes sensing an identity and a proximity of a user equipped with a radio-enabled component to the appliance and confirming the identity is that of an authorized user. The method also includes monitoring an operating state of the appliance and altering the operating state of the appliance depending on the proximity of the authorized user. In some implementations, the appliance includes an electric-powered device, a natural gas-powered device, a geothermal-powered device, a solar-powered device, a gasoline-powered device, a diesel-powered device, a propane-powered device, an appliance, and any combination thereof. The radio-enabled device may be a dongle, a smartphone, a tablet computer, a personal digital assistant, a smartwatch, Google glasses, a laptop computer, a notebook computer, a fitness tracker, and a cellular telephone. In some variations, confirming the identity is that of an authorized user may include recognizing a unique MAC address or other device-specific unique identifier that is allowed to engage or disengage the system. In other cases, the radio-enabled device may store a software-based or virtual key or set of keys that may be used to identify and/or authorize the device to communicate with or control the appliance.

In some implementations, the method further includes monitoring, by a third-party sensor, a condition proximate to the appliance, communicating to the authorized user that the appliance is in an on state, communicating to the authorized user that the appliance has been shut off, and/or monitoring at least one sensor external to the appliance and changing the operating state of the appliance due to input date from sensor(s) (e.g., a thermostat, a thermometer, a smoke alarm, a carbon monoxide alarm, an optical sensor, a magnetic field detector, an electrical filed detector, a burglar alarm, a hygrometer, a current sensor, a flow sensor, a pressure sensor, and any combination thereof). In other implementations, altering the operating state of the appliance comprises shutting off the appliance when the proximity of the authorized user is beyond a pre-established zone and, more particularly, altering the operating state of the appliance comprises shutting off the appliance when the authorized user is beyond the pre-established zone for a pre-defined period of time, and/or shutting off the appliance when the authorized user is beyond the pre-established zone after a notification and control procedure.

In further variations, the method may also include collecting data about the operating state of the appliance and/or using the collected data to calculate risk for insurance or other similar purposes. In such cases, the collected data may be aggregated for market intelligence, to develop manufactured products, to develop food products, to provide market and sales data to utility companies, to provide market and sales data to manufacturers, and/or to provide market and sales data to insurance companies.

A second aspect of the present invention discloses a system for monitoring and controlling an appliance via a communication network(s). In some embodiments, the system includes a portable radio-enabled component to, in part, provide proximity data about a user, one or more sensors external to the appliance to provide data about conditions external to the appliance, and a processing device in communication with the appliance, the radio-enabled component, and the sensor(s) via a communication network(s). In some implementations, the processing device includes a radio proximity detection device to determine a proximity of the radio-enabled component and a user to the appliance, a database(s) containing a list of authorized users, and a monitor and control module to monitor the operating state of the appliance and to alter the operating state of the appliance depending on the proximity of the authorized user to the appliance and/or to external conditions data from the sensor(s).

In some implementations, the system further includes a transmitting device for transmitting to the authorized user information on the operating state of the appliance and/or a message that, due to external conditions data, the appliance has been shut off. In some variations, the monitor and control module is adapted to disconnect the appliance from at least one power source; and the database(s) is configured to collect and store device usage and operating state data.

A third aspect of the present invention describes an article of manufacture having computer-readable program portions embedded thereon for monitoring and controlling an appliance. In some embodiments, the program portions include instructions to sense an identity and proximity of a user equipped with a radio-enabled component to the appliance, confirm the identity is that of an authorized user and/or the radio-enabled component; monitor an operating state of the appliance; and alter the operating state of the appliance depending on the proximity of the authorized user. In some variations, the program portions further include instructions to shut off the appliance when the proximity of the authorized user is beyond a pre-established zone.

In certain configurations, the system acts as an on/off switch or valve enabling an appliance when an authorized radio component is in proximity, and disabling it when no authorized radio-enabled component is in range, either immediately or for a predetermined period of time.

In certain configurations, the system transmits the operating state of a connected appliance via cloud-based service for remote monitoring and control applications and usage data storage.

In certain configurations, advanced logic enables advanced monitoring and control of appliances. For example, integrating cloud-based services, safety timers, and other applicable application logic.

In certain configurations, the system is configured via cloud-based services with respect to enabling or disabling authorized components, setting component authorization schedules, setting parameters such as warning times and shut off times, and so forth.

In certain configurations, the system is controlled via cloud-based services. Control could apply to, for example, shutting down an appliance, restarting an appliance, providing exceptions to programmed logic, and so forth.

In other implementations the system further includes a user interface for facilitating a user's interaction with and configuration of the system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION OF THE INVENTION

As a preliminary matter, it will readily be understood by one having ordinary skill in the relevant art that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention. Accordingly, although the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof.

Figure 1:
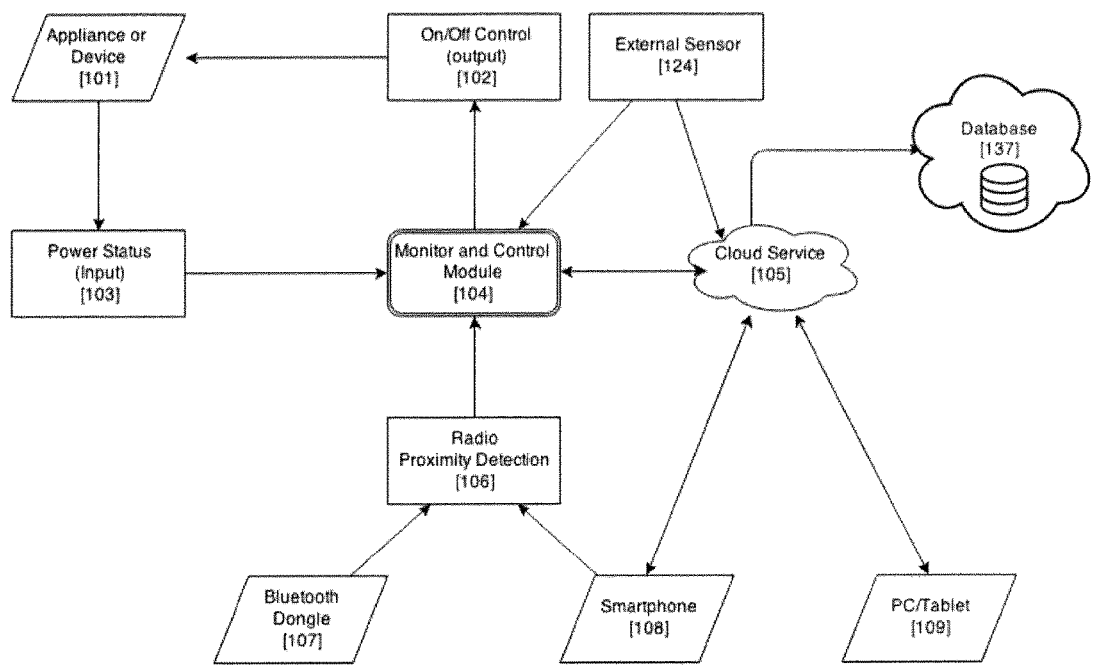
FIG. 1 is a block diagram providing an illustrative embodiment of a system for monitoring and controlling an appliance or powered device in accordance with some embodiments of the present invention.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses FIG. 1 shows an exemplary architecture for a system 100 for monitoring and controlling an appliance 101 in accordance with various embodiments of the present invention. In some implementations, the system 100 includes at least one monitor and control module 104, at least one radio-enabled component or device 107, 108, an appliance state sensing or power status device 103, at least one auxiliary sensing device 124, and at least one database 137 that interact and are in communication via at least one communication network 105, e.g., a cloud-based service. The appliance 101 may include, for the purpose of illustration and not limitation, an electric-powered device, a natural gas-powered device, a geothermal-powered device, a solar-powered device, a gasoline-powered device, a diesel-powered device, a fuel cell-powered device, a battery-powered device, a propane-powered device, and any combination thereof. Although this application may refer to electric-, natural gas-, and propane-powered appliances 101, the teachings of this application may be applied to any power source including, but not limited to, heat, steam, induction, geothermal, hydrogen, and solar. Furthermore, although this application may refer to an appliance 101, the teachings of this application may also be applied to any apparatus including, but not limited to, lighting, machinery, pumps, vehicles, and power generators.

The radio-enabled device 107, 108 may include any device that communicates using radio-enabled technology such as, but not limited to, low power and standard Bluetooth, RFID, Zigbee, Z-Wave, WiFi, NFC, and any combination(s) thereof. Moreover, for the purpose of illustration and not limitation, the radio-enabled device 107, 108 may be a dongle, a smartphone, a tablet computer, a personal digital assistant, a smart watch, Google glasses, a laptop computer, a notebook computer, a cellular telephone, and the like.

The communication network 105 may include any communication network through which system components may exchange data, e.g., the World, Wide Web, the Internet, an intranet, a wide area network (WAN), a local area network (LAN), and so forth. To exchange data via the communication network 105, the monitor and control module 104, database 137, sensing device 103, and radio-enabled processing systems 107, 108 and the network 105 itself may use various methods, protocols, and standards, including, inter alia, token ring, Ethernet, TCP/IP, UDP, HTTP, FTP, and SNMP.

Figure 2:
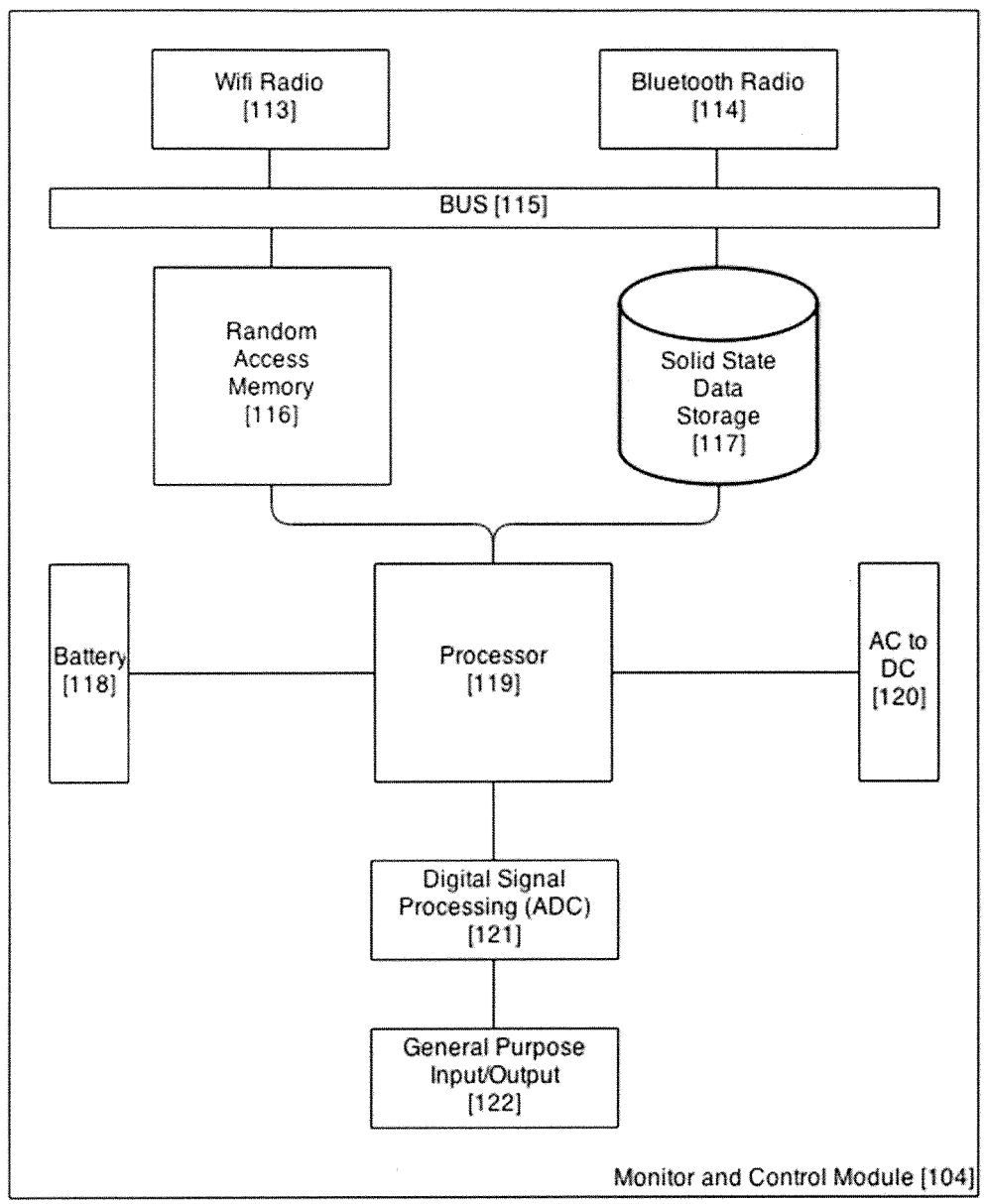
FIG. 2 is a functional diagram of an illustrative embodiments of the monitor and control module of the system of FIG. 1.

The monitor and control module 104 may be a standalone apparatus or may be a combination of physical components that are connected and in communication with one another, e.g., via hardwire or wireless radio. Indeed, aspects in accordance with the present invention may be located on a single processing system or may be distributed among a plurality of systems connected to one or more communications networks 105. As shown in FIG. 2, in some variations, the monitor and control module 104 may comprise a processor 119 and memory components 116, 117. The processor 119—as well as the entire monitor and control module 104—may be powered by a battery 118, an AC to DC power converter 120, and similar energy sources. The processor 119 may include a commercially-available processor such as an Intel Core, Motorola PowerPC, MIPS, UltraSPARC, or Hewlett-Packard PA-RISC processor, but also may be any type of processor or controller as many other processors, microprocessors, and controllers are available. There are many examples of processors 119 currently in use including network appliances, personal computers, workstations, mainframes, networked clients, servers, media servers, application servers, database servers, and web servers. Other examples of processors 119 may include mobile computing devices, such as cellphones, personal digital assistants, and network equipment, such as load balancers, routers, and switches.

The monitor and control module 104 may include an operating system that manages at least a portion of the hardware elements included therein. Usually, a processing device or controller, such as processor 119, executes an operating system which may be, for example, a Windows-based operating system (e.g., Windows 7, Windows 2000 (Windows ME), Windows XP operating systems, and the like, available from the Microsoft Corporation), a MAC OS System X operating system available from Apple Computer, a Linux-based operating system distributions (e.g., the Enterprise Linux operating system, available from Red Hat Inc.), a UNIX operating system available from various sources or a FreeRTOS operating system from Real Time Engineers, Ltd. of London, England. Many other operating systems may be used, and embodiments are not limited to any particular implementation. Operating systems conventionally may be stored in memory.

The processor 119 and operating system together define a processing platform for which application programs in high-level programming languages may be written. These component applications may be executable, intermediate (for example, C−) or interpreted code which communicate over a communication network (for example, the Internet) using a communication protocol (for example, TCP/IP). Similarly, aspects in accordance with the present invention may be implemented using an object-oriented programming language, such as SmallTalk, Java, C++, Ada, or C# (C-Sharp). Other object-oriented programming languages may also be used. Alternatively, functional, scripting, or logical programming languages may be used. For instance, aspects of the system may be implemented using an existing commercial product, such as, for example, Database Management Systems such as SQL Server available from Microsoft of Seattle, Wash., and Oracle Database from Oracle of Redwood Shores, Calif. or integration software such as Web Sphere middleware from IBM of Armonk, N.Y. However, a computer system running, for example, SQL Server may be able to support both aspects in accordance with the present invention and databases for sundry applications not within the scope of the invention.

In one or more of the embodiments of the present invention, the processor 119 is adapted to execute at least one application, algorithm, driver program, and the like, to receive, store, perform mathematical operations on data, and to provide and transmit the data, in their original form and/or, as the data have been manipulated by mathematical operations, to an external communication device 122 for transmission via the network 105. The applications, algorithms, driver programs, and the like that the processor 119 may process and may execute can be stored in "memory." The processor 119 may also perform functions outside the scope of the invention. In such instances, aspects of the system may be implemented using an existing commercial product, such as, for example, Database Management Systems such as SQL Server available from Microsoft of Seattle, Wash., and Oracle Database from Oracle of Redwood Shores, Calif. or integration software such as Web Sphere middleware from IBM of Armonk, N.Y. However, a computer system running, for example, SQL Server may be able to support both aspects in accordance with the present invention and databases for sundry applications not within the scope of the invention.

"Memory" may be used for storing programs and data during operation of the system 100. "Memory" can be multiple components or elements of a data storage device or, in the alternate, can be stand-alone devices 116, 117. More particularly, "memory" can include volatile storage, e.g., random access memory (RAM) 116, and/or non-volatile storage, for example, a read-only memory (ROM) 117. The former may be a relatively high performance, volatile, random access memory 116 such as a dynamic random access memory (DRAM) or static memory (SRAM). Various embodiments in accordance with the present invention may organize "memory" into particularized and, in some cases, unique structures to perform the aspects and functions disclosed herein.

The monitor and control module 104 contains the operating logic to process these inputs and to effectuate on/off control of the appliance 101. The operating logic would depend on the intended application. Components of the monitor and control module 104 may be coupled by an interconnection element such as a bus 115. The bus 115 enables communications, e.g., the transfer of data and instructions, to be exchanged internally between module components and externally between system components. Thus, the bus 115 may include one or more physical busses, e.g., between components that are integrated within the module 104, as well as a communication coupling between system 100 elements, e.g., specialized or standard computing bus technologies such as IDE, SCSI, PCI, and Infini-Band. Advantageously, the WiFi radio 113 and the Bluetooth radio 114 may share the same bus 115 to access the random access memory 116 and the solid state data storage 117.

In certain configurations, the monitor and control module 104 may include a user input and output interface that may include, but is not limited to, buttons, switches, membranes, keyboards, displays, status lights, microphones, speakers, and the like, to enable users to interact with the monitor and control module 104 directly. In certain configurations, the processor 119 may also control an integrated display and user interface. Furthermore, the monitor and control module 104 may also include various communication ports. For example, a WiFi radio port 113, a Bluetooth radio port 114, and an analog or digital input/output port 122, for internal and external communication may be provided. Although this application refers to a Bluetooth radio 114, those of ordinary skill in the art will understand that the teachings of this application can be applied to other radio-enabled technologies including, but not limited to, Zigbee, Z-Wave, RFID, WiFi, and NFC. Accordingly, in some implementations, additional modules may be added to the monitor and control module 104 including, but not limited to, a cellular modem, a Zigbee radio, a Z-Wave Radio, a RFID, a NFC, a USB port, and so forth. One or more of these modules may be combined into a single module.

In some implementations, the WiFi radio port 113 and/or Bluetooth radio port 114 may be used in combination with a radio proximity detection device 106, to receive radio signals from radio-enabled devices, e.g., dongle 107, smart phone 108, and the like. For example, in operation, the Bluetooth radio 114 may be used to locate proximate Bluetooth components that are within a pre-determined radius of the appliance of device 101 and, moreover, to identify them, e.g., by their unique MAC address. As will be discussed in greater detail below, receipt of a radio signal from any authorized radio-enabled device 107, 108 may be used to trigger certain events or actions that also will be described in greater detail below. In some implementations, the analog or digital input/output port 122 may be used internally to transmit to and receive communications from a control device 102 and/or the power status device 103 and/or may be used externally to communicate with other processing devices 109 or memory 137, e.g., via the communication network 105. For external communication, a wired or wireless network adapter may be required. Furthermore, in some implementations, a digital signal processing multiplexer/demultiplexer 121 may be in communication with or integrated into the processor 119, to receive sensor inputs or provide control outputs.

Receipt of a wired or wireless signal from the power status device 103 and transmission of a wired or wireless signal to the control device 102 will be described in greater detail below. However, in some embodiments, proximity detection, by the radio proximity detection device 106, of radio signals from Bluetooth-enabled components, such as smartphones 108 or Bluetooth dongles and/or other wearable electronics 107, may be used to control the on/off operating state of the appliance 101 by controlling the state of the control device 102. Furthermore, the monitor and control module 104 may also be adapted to monitor the power status of the appliance 101, via received data signals from the power status device 103.

In some embodiments, the on/off operating state of the appliance 101 may be controlled via any conventional on/off control device 102, to engage or disengage power from the appliance 101. The control device 102 may be a stand-alone device, integrated into the appliance or powered device, and/or integrated into the monitor and control module 104. In some variations, the on/off control device 102 may consist of an electric relay, a solenoid valve, a switching device, and the like. FIGS. 3A to 3D show exemplary block diagrams illustrating exemplary physical connection methods for the system 100. Ordinary Artisans can appreciate that, although only four block diagram scenarios are shown, this application may be configured in alternate configurations based on the application requirements. Moreover, although this application may refer to relays for electric-powered and/or valves for gas-powered on/off control, those of ordinary skill in the art can appreciate that the teachings of this application may be applied to any other form of control mechanism.

Figures 3A, 3B, 3C, 3D:
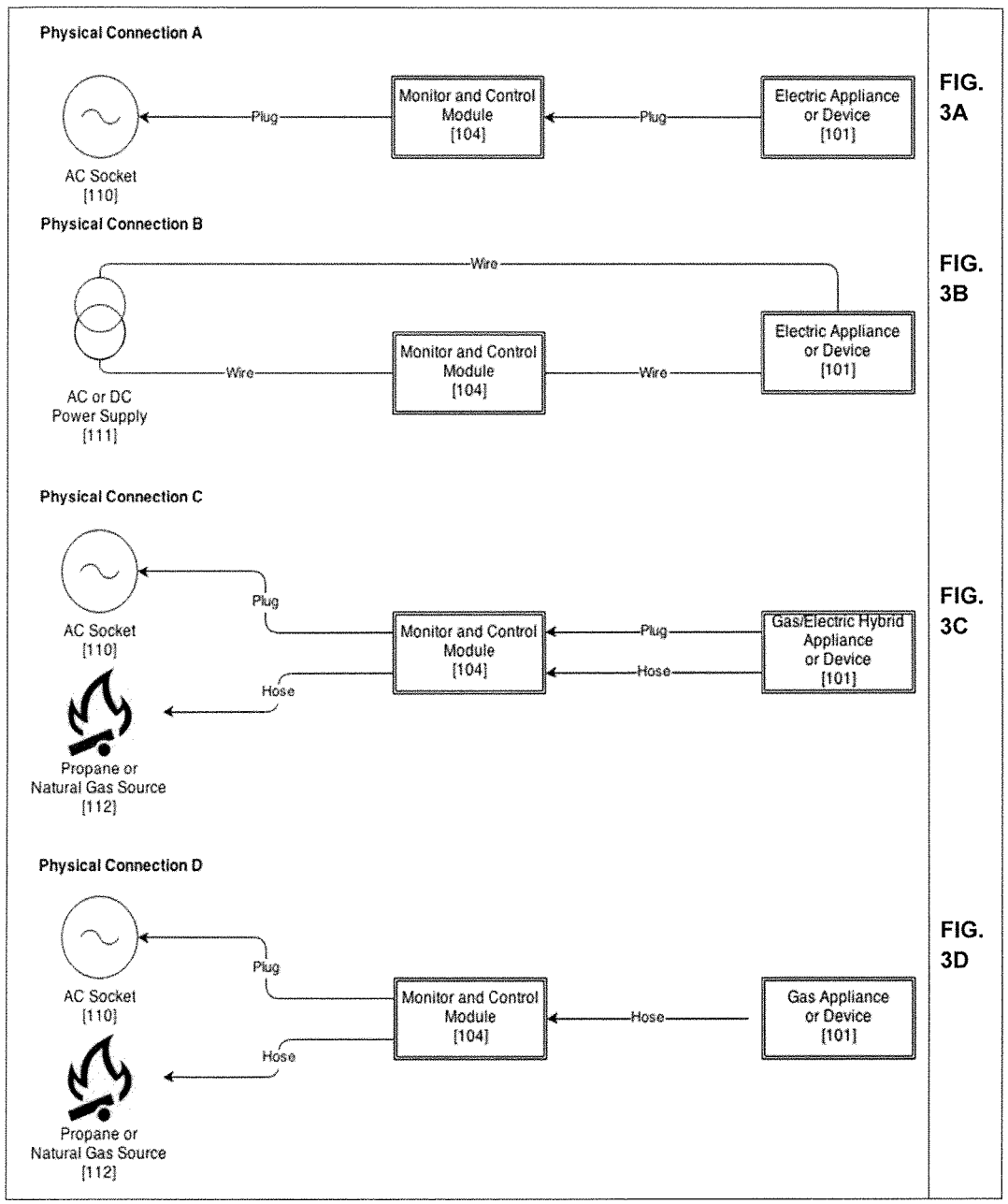
FIG. 3A-FIG. 3D are diagrams illustrating four exemplary physical connection methods for the system of FIG. 1.

For example, referring to FIG. 3A, an electric appliance 101 is electrically coupled, e.g., via an electrical plug, to the monitor and control module 104, which is electrically coupled, e.g., via an electrical plug, to an AC power socket 110. This embodiment allows the monitor and control module 104 to be installed quickly and easily as the appliance 101 can be readily plugged into the monitor and control module 104, which can be readily plugged into an AC power socket 110. Such an embodiment may be ideal for an electric range, a space heater, an air conditioner, and the like.

Referring to FIG. 3B, an electric appliance 101 is electrically coupled, e.g., via hardwire, to the monitor and control module 104, which is electrically coupled, e.g., via hardwire, to an AC or DC power source 111. For example, the monitor and control module 104 may be is wired into a circuit on one of the poles between the electric appliance 101 and a power supply 111. This arrangement allows the monitor and control module 104 to be installed as part of a larger, integrated system. Such an embodiment may be used to replace a light switch.

A gas/electric hybrid appliance 101 is shown in to FIG. 3C. Similar to FIG. 3A, the electric plug from a gas/electric hybrid appliance 101 may be electrically coupled, e.g., via an electrical plug, to the monitor and control module 104, which in turn may be electrically coupled, e.g., via an electrical plug, to an AC power socket 110. A gas line may also be plumbed between the gas/electric hybrid appliance 101 and the monitor and control module 104, which, in turn, may be plumbed to a propane or natural gas source 112. An example of this application would be a gas range with or without an electric oven.

A gas-powered appliance 101 is shown in FIG. 3D. The gas line of a gas-powered appliance 101 may be plumbed between the gas appliance 101 and the monitor and control module 104, which, in turn, is may be plumbed to the propane or natural gas source 112. The monitor and control module 104 may also be electrically coupled, e.g., via a plug, into an AC power socket 110, to provide operating power. Such an embodiment may include a gas-only range.

The power (on/off) status of the appliance 101 may be monitored by a conventional power status sensor 103, e.g., a voltage or current sensor for electric applications and/or a pressure or flow sensor for natural gas and propane applications. In some implementations, the power status sensor 103 may be disposed proximate but external to or integrated into the monitor and control module 104, while in other implementations, the power status sensor 103 may be disposed proximate but external to or integrated into the appliance 101, e.g., to monitor the magnitude of power consumption by the appliance 101 in order to determine its operational state. Although this application refers to sensors 103 for power status input, this application can be applied to other input criteria including, but not limited to, temperature, gas, electric field, magnetic field, humidity and optical sensors.

The proximity detection device 106 of the monitor and control module 104 is configured to receive data signals, e.g., wireless, radio signals, to detect the presence of radio-enabled devices, e.g., smartphones 108, Bluetooth dongles 107, and the like, and, more specifically authorized radio-enabled devices 107, 108. For reasons that will be discussed in greater detail below, these radio-enabled devices would need to be known and authorized by the monitor and control module 104 in order to control the state of an appliance 101. Although this application may refer to smartphones 108 and Bluetooth dongles 107, the teachings of the application can be applied to any radio-enabled component including, but not limited to, tablets computers, smart watches, activity monitors, laptop computers, cellular telephones, personal digital assistants, and the like. The proximity detection device 106 may be a stand-alone device or may be integrated into the monitor and control module 104.

In some implementations, a Bluetooth dongle 107 may be supplied for use with this application. This dongle 107 may consist of a low power or standard Bluetooth radio and power supply with an application-appropriate enclosure, e.g., a wearable clip-on dongle or bracelet. In certain configurations, the Bluetooth dongle 107 may have inputs and outputs for additional functionality such as a master control for the monitor and control device 104 that could be used to reset an appliance 101 or to authorize additional radio-enabled components to access the appliance 101.

In some variations, a local or remote processing device, e.g., smartphone 108, or other processing device 109, may provide additional parameters and control instructions to the monitor and control module 104, e.g., via the communication network 105. More particularly, Internet-connected devices such as a smartphone 108, PC/tablet 109, and the like may be used to provide additional control, overrides, and/or operating parameters to the monitor and control module 104 via a radio connection, e.g., a WiFi network or a cellular network, to the Internet or cloud-based service(s) 105, which, in some implementations, could be used to provide additional control, overrides or operating parameters to the monitor and control module 104. For example, cloud-based services 105 could encompass direct interaction via software, a Webpage, and/or mobile application on a smartphone 108, personal computer or tablet 109, or automated interaction via application programming interface (API) or electronic data interchange (EDI).

Optionally, the processor 119 may also be structured and arranged to monitor the state of the battery 118, the power input from the AC to DC step down transformer 120, the remaining storage space available in the random access memory 116 and/or in the solid state data storage 117, and the bandwidth available on the bus 115. For example, current and historical usage data may be recorded, e.g., via the communication network 105, to a database 137 for future data analysis activities.

In some embodiments, at least one sensing device 124, e.g., a smoke alarm, a fire alarm, a burglar alarm, a carbon monoxide monitor, and the like, may also provide data about what is happening proximate to the appliance 101 to the monitor and control module 104, e.g., via the communication network 105. For example, such data may be used to determine that the appliance 101 is in an on or activation state. In the event that the system 100 has also determined that an authorized user is not proximate the appliance 101, in some implementations, the system 100 may shut the off. For example, if smoke were detected, the system 100 may shut off the appliance 101 if an authorized user is not near the appliance 101.

In operation, a radio 113 may be used to join a local area network and enable interaction with a cloud-based service 105 over the Internet, e.g., to upgrade firmware, transmit and communicate current status and usage history and to receive parameters and instructions.

Figure 4A:
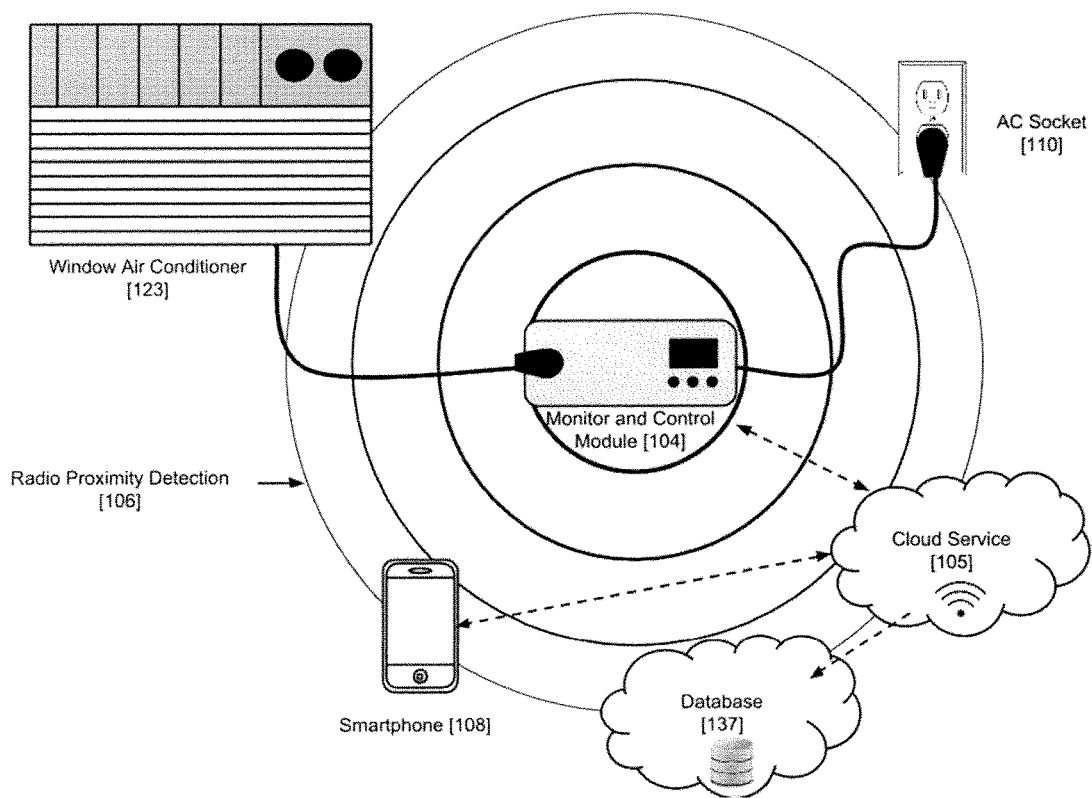
FIG. 4A is an illustrative embodiment of an energy saving application such as switching on/off a wall- or window-mounted air conditioner.
Figure 4B:
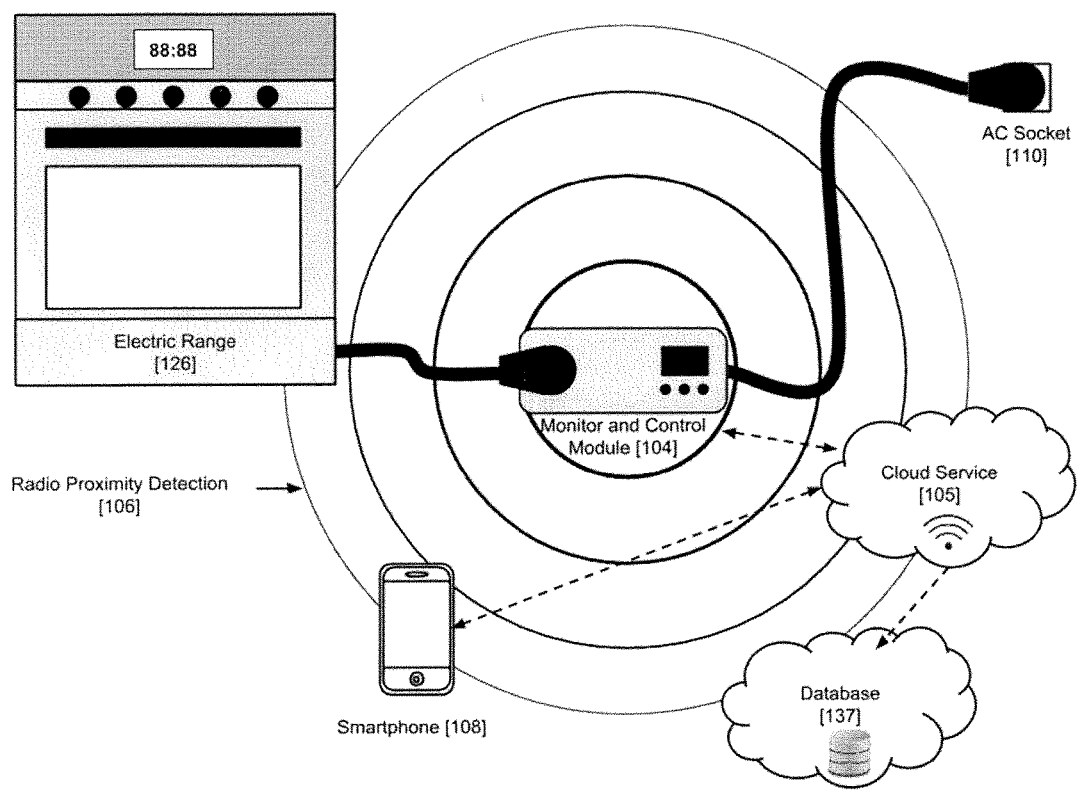
FIG. 4B is an illustrative embodiment of a safety monitoring and control implementation for monitoring and controlling the operating state of an electric range.
Figure 4C:
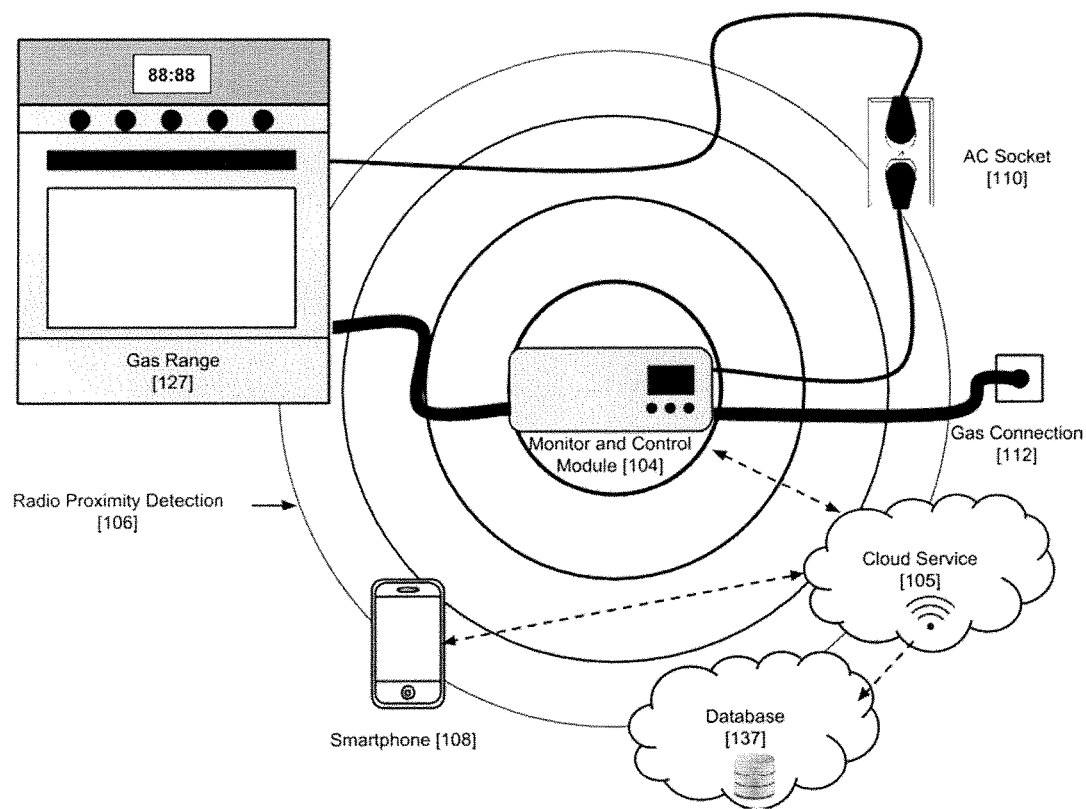
FIG. 4C is an illustrative embodiment of a safety monitoring and control implementation for monitoring and controlling the operating state of a gas range.

Examples of illustrative embodiments of possible systems 100 are shown in FIGS. 4A to 4C. FIG. 4A is an illustrative example of an energy saving application for switching on/off a wall- or window-mounted air conditioner 123. The appliance may also be a space heater, fan, dehumidifier, lights or similar appliance or powered device for changing one or more qualities, e.g., temperature, humidity, brightness, and so forth, of the environment proximate the appliance or device. In particular, FIG. 4A illustrates an energy saving application in which the monitor and control module 104 is used to turn on an air conditioner 123 when an authorized radio-enabled device 108 is within a pre-determined range and, then, to turn off the air conditioner 123 when the authorized radio-enabled device 108 is not within the pre-determined range for a pre-determined amount of time. This capability reduces the on time of the air conditioner 123 when no one is in the room, saving valuable energy.

In one implementation, the air conditioner 123 is electrically coupled to the monitor and control module 104 which is then electrically coupled to an AC power source, e.g., a wall socket 110. The radio proximity detection device 106 of the monitor and control module 104 scans, e.g., using Bluetooth technology and the like, for any authorized radio-enabled devices, such as smartphones 108, within the pre-determined range. In some variations, the radio proximity detection device 106 and the radio-enabled device 108 can establish communication directly, e.g., via a handshake or other authenticated method. Alternatively, in another variation, the proximity of the radio-enabled device 108 to the radio proximity detection device 106 may be established via a communication network 105. Once a radio-enabled device 108 has been identified and deemed to be an authorized device, the monitor and control module 104 may establish communication with the air conditioner 123, to control the same.

Advantageously, control of the air conditioner 123 may be customized to include and take into account preferences of the user associated with the authorized radio-enabled device 108. Such preferences may be pre-established and stored in a database 137 that includes storage space for such data and information. As a result, for example, one user's preference may be associated with a colder temperature than another user or the user may have preferences that change according to the time of day or night.

The continued presence and proximity of the radio-enabled device 108 detected by the radio proximity detection device 106 may maintain the air conditioner 123 in an on operating state. However, if the presence and/or proximity of the radio-enabled device 108 is not detected by the radio proximity detection device 106, the monitor and control module 104 may be further adapted to change the operating state of the air conditioner 123, e.g., to turn it off, which may occur when the presence and/or proximity is not detected for a pre-determined period of time, e.g., thirty minutes, an hour, and the like.

Optionally, a communication cloud-based service 105 may be used to store usage data within a database 137 of the radio-enabled device 108. Such data may be used to generate energy saving usage reports to the device owner and to provide overrides and parameters to the monitor and control unit 104. In certain configurations, recorded usage data within a database 137 may also be provided or sold to interested third parties, e.g., electric utilities and the like.

In addition to being used in connection with energy conservation, the system 100 of the present invention may also be used to control potentially dangerous appliances 101 such as electric or gas ranges. FIGS. 4B and 4C provide illustrative embodiments of safety monitoring and control applications such as monitoring and controlling, respectively, the state of an electric range 126 or a gas range 127. In particular, FIGS. 4B and 4C provide illustrative embodiments of safety applications in which a monitor and control module 104 may be used to control the electric range 126 or gas range 127, respectively, and to monitor the current operating state of the range. While these examples expressly refer to an electric range 126 or a gas range 127, this is done for illustrative purposes only, embodiments of the invention may also apply to gas fireplaces, indoor or outdoor grills, space heaters, and any other potentially dangerous powered device.

In this example, the electric cord or plumbed gas of the electric range 126 or gas range 127, respectively, is coupled to the monitor and control module 104, which is electrically coupled to an AC power socket 110 or gas source connection 112. As previously described, the radio proximity detection device 106 of the monitor and control module 104 scans, e.g., using Bluetooth technology and the like, in search for any authorized radio-enabled devices, such as smartphones 108, within the pre-determined range. In some variations, the radio proximity detection device 106 and the radio-enabled device 108 can establish communication directly, e.g., via a handshake. Alternatively, in another variation, the proximity of the radio-enabled device 108 to the radio proximity detection device 106 may be established via a communication network 105. Once a radio-enabled device 108 has been identified and deemed to be an authorized device, the monitor and control module 104 may establish communication with the range 126, 127, to control the same. Communication may consist of a combination of one or more physical components connected via wire or wireless radio.

The continued presence and proximity of the radio-enabled device 108 detected by the radio proximity detection device 106 maintains the range 126, 127 in an on operating state. However, if the presence and/or proximity of the radio-enabled device 108 is not detected by the radio proximity detection device 106, the monitor and control module 104 may be further adapted to change the operating state of the range 126, 127, e.g., to turn it off, which may occur when the presence and/or proximity is not detected for a pre-determined period of time, e.g., thirty minutes, an hour, and the like. The monitor and control module 104 may also be in communication with a sensing device 124 that is disposed external to the range 126, 127, to provide an additional level of security and safety. For example, a smoke or fire alarm 124 may establish communication directly, e.g., via a handshake, with the monitor and control module 104 in manner that is well known to those of ordinary skill in the art. Alternatively, in another variation, the sensing device 124 and the monitor and control module 104 may be established via a communication network 105. In either instance, a smoke or fire alarm triggering event may cause the sensing device 124 to generate an event signal that can be transmitted, e.g., via hardwire or wirelessly, to the monitor and control module 104. Such an alert message, coupled with the detected absence of the radio-enabled device 108 proximate the range 126, 127 may cause the monitor and control module 104 to change the operating state of the range 126, 127, i.e., to turn it off, as a safety precaution.

Optionally, a communication cloud service 105 may be used to store usage data within the database 137 of the radio-enabled device 108. Such data may be used to generate energy saving usage reports to the owner and to provide overrides and parameters to the monitor and control unit 104. In certain configurations, recorded usage data within the database 137 may also be provided or sold to interested third parties, e.g., electric utilities and the like.

Figure 5:
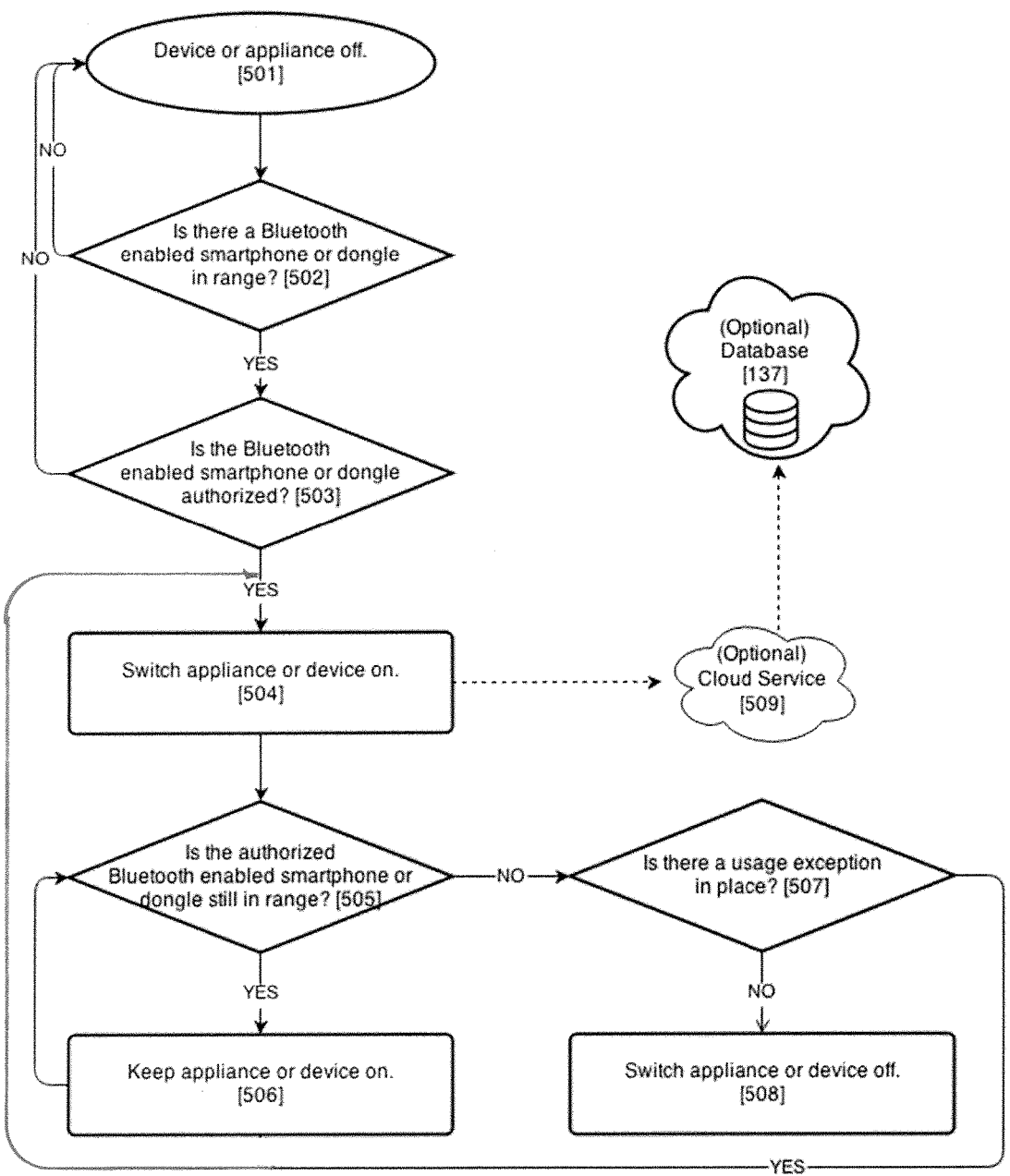
FIG. 5 is a flowchart illustrating an embodiment of a process for turning on or off the appliance or powered device of FIG. 4A in accordance with some embodiments of the present invention.

Having described various systems for monitoring and controlling appliances and powered devices, methods of doing the same using radio-enabled proximity sensing will now be described. Referring to FIG. 5, a flow diagram illustrating a process of turning on/off the appliance of FIG. 4A, in accordance with one or more preferred embodiments of the present invention, is shown. While the appliance is in an off operating state 501, the monitor and control module searches for transmitted signals from a radio-enabled device, to determine whether or not the transmitting radio-enable device(s) is in range 502. If a radio-enabled device is detected within a pre-determined range, the monitor and control module will then ascertain whether or not the radio-enabled device is authorized 503. In some variations, confirming the identity is that of an authorized user may include recognizing a unique MAC address that is allowed to engage or disengage the system. In some variations, a list of authorized devices may be maintained in a local or remote memory, i.e., database, with which the monitor and control module is in communication. An identifier, MAC address, code, and the like in the received signal can be compared to the data in the local or remote memory.

Once the detected device has been authorized, the appliance 504 may be switched on. Switching on the appliance 504 may include accessing a database containing preferences pre-established by the user for the appliance. Such preferences may include, for the purpose of illustration and not limitation, a temperature preference, a mode of operation (HI, LO) preference, and so forth. In certain configurations, the monitor and control module may also send the change of operating state status to a database, e.g., via a cloud-based service 509. Such data may be used to generate a log recorded by the database or provide current appliance status remotely, e.g., via push notification to a user's mobile device. In certain configurations, the usage information stored in the database may further be provided or sold to a third party for applications such as analysis, marketing, or actuarial.

Once the appliance has been turned on 504, the monitor and control module continues to monitor that the authorized radio-enabled device is still within the pre-determined range 505. As long as the authorized radio-enabled device remains in range and is detected by the monitor and control module, the monitor and control module will maintain the operating on state status of the appliance 506. However, once the authorized radio-enabled device is not within the pre-determined range or is otherwise not detected by the monitor and control module, the monitor and control module will determine whether or not there is a usage exception in place 507. For example, a usage exception may be, but is not limited to, a manual override from a smartphone application communicated through a cloud-based service. Another usage exception may be time-based, whereby the radio-enabled device must not be detected or detectable for a pre-determined period of time, e.g., thirty minutes, an hour, and so forth, before the monitor and control module turns off the appliance 508. Usage exceptions may be created by each authorized user and may be stored in a database provided for that purpose. Accordingly, usage exceptions may vary from user to user.

If there is no usage exception in place and/or the radio-enabled device has not been detected for the pre-determined period of time, the monitor and control module will switch off the appliance 508. If there is a usage exception in place, however, the monitor and control module will not change the operating state of the appliance until the usage exception has been removed.

Figure 6:
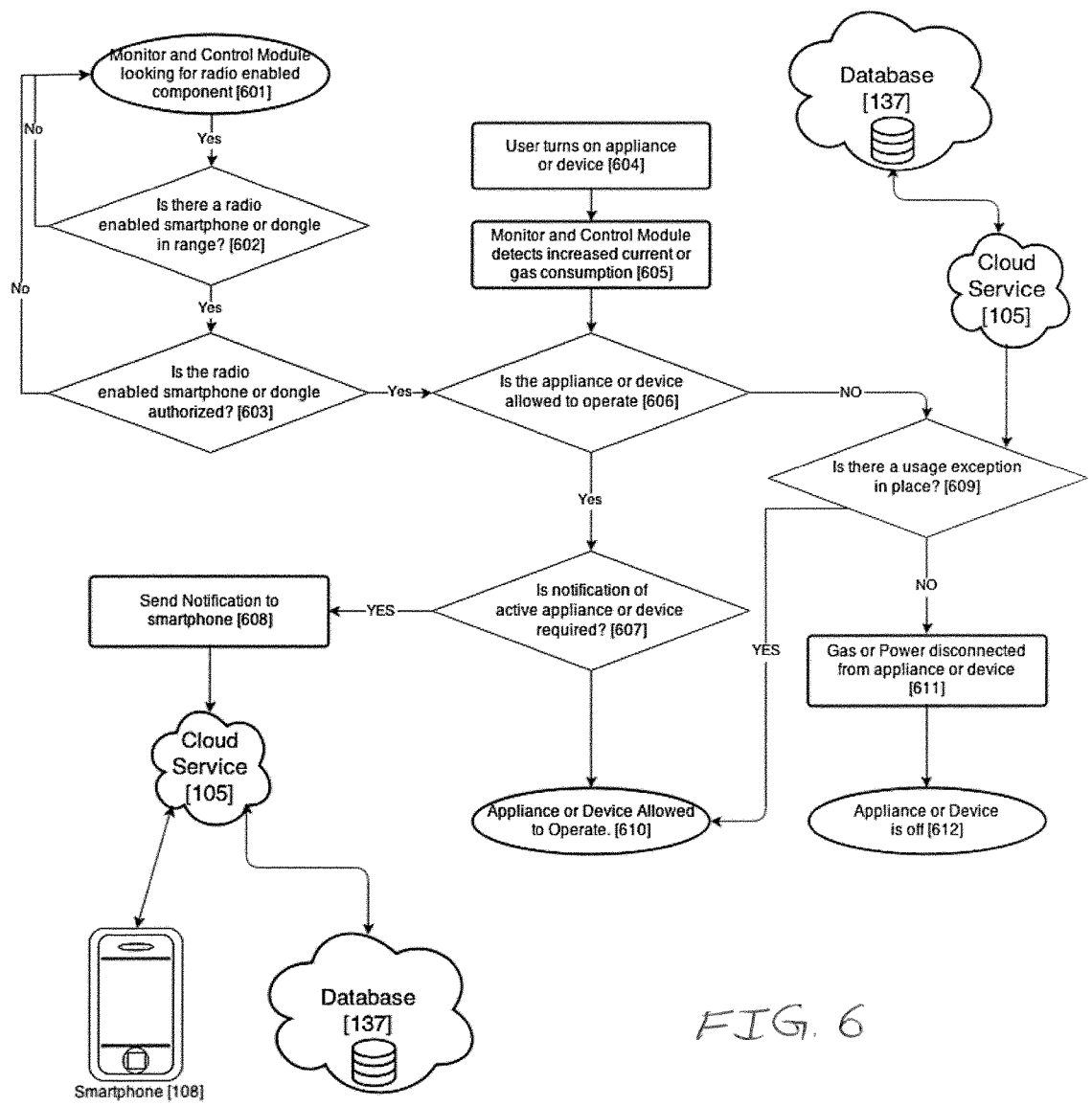
FIG. 6 is a flow diagram of an illustrative embodiment of a process of monitoring and controlling an appliance or a process of monitoring and controlling an appliance or device such as the safety application depicted in FIGS. 4B and 4C, in accordance with some embodiments of the present invention.

FIG. 6 is a flow diagram illustrating a process of monitoring and controlling an appliance such as the safety application depicted in FIGS. 4B and 4C in accordance with some of the preferred embodiments of the present invention. The monitor and control module continuously monitors for signals from a radio-enabled device, to determine whether or not a radio-enable device(s) is in range 601. If a radio-enabled device is detected within a pre-determined range 602, the monitor and control module will ascertain whether or not the radio-enabled device is authorized 603. In some variations, confirming the identity is that of an authorized user may include recognizing a unique MAC address that is allowed to engage or disengage the system. In some variations, a list of authorized devices may be maintained in a local or remote memory, i.e., database, with which the monitor and control module is in communication. An identifier, MAC address, code, and the like in the received signal can be compared to the data in the local or remote memory.

Once an authorized user manually or remotely turns on an appliance 604, the monitor and control module may be adapted to detect, e.g., via the power status input, increased power, i.e., current or gas, consumption by the appliance 605. If the appliance is allowed to operate 606, it will function as intended 610. In some variations, notification of an appliance being active may be requested or required 607. For example, a list of combinations of appliances and/or authorized users may be stored locally or remotely in memory; so that, the applicable notification database may be compared to the appliance and authorized user in question. If notification is required or requested, the monitor and control module is adapted to transmit a notification 608 to a radio-enabled device(s), or other Internet-connected device, e.g., by way of a cloud-based service or other communication network.

If, on the other hand, at step 606 it is determined that the appliance is not allowed to operate, then the monitor and control module may be adapted to check to ascertain whether or not there is a usage exception in place 609. For example, a usage exception may be, but is not limited to, a manual override from a radio-enable device, e.g., via communication network or cloud-based service, to allow the appliance to operate. If there is a usage exception in place, the appliance is allowed to operate 610. If, on the other hand, there is no exception in place, the delivery of power, e.g., gas, electricity, and so forth, to the appliance may be disconnected 611 and the appliance is shut down 612. All of the steps described above may be recorded, e.g., on a database, for further data processing and/or monetization.

Figure 7:
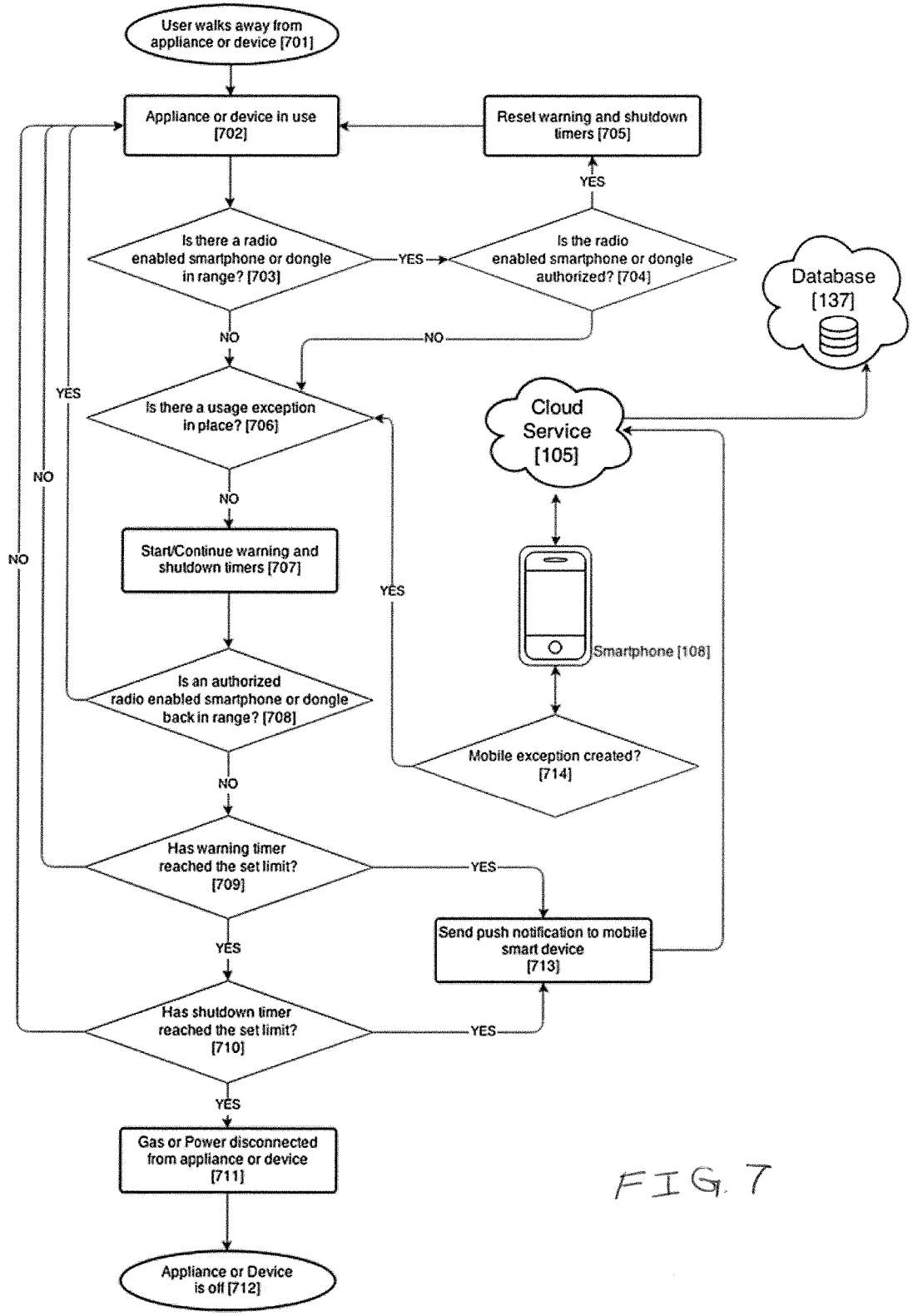
FIG. 7 is a flow diagram illustrating an exemplary process of monitoring and controlling an appliance or powered device such as the safety application depicted in FIGS. 4B and 4C in accordance with some embodiments of the present invention.

Referring to FIG. 7, another embodiment of the present invention is shown. In this scenario, an authorized user has already turned on the appliance 702 but has since walked away 701 from the appliance. In this embodiment, the monitor and control module continuously or periodically monitors for signals from the authorized user's radio-enabled device 703, and then verifies that signals received from a radio-enabled component correspond to a user who is authorized 704 to operate the appliance or, more specifically, verifies that signals received from a radio-enabled component correspond to the user who turned on appliance. If the monitor and control module determine that there is an authorized radio-enabled component 704 and the radio-enabled device is in range 703, then an active warning timer and/or shutdown timer are reset and the appliance is allowed to continue to operate 705.

If either there is no radio-enabled component in range or if the radio-enabled component detected is not authorized to control the appliance, then the monitor and control module determines if there is a usage exception in place 706 that would allow the appliance to continue operate despite the absence of an authorized user. For example, a usage exception may be, but is not limited to, a mobile exception created 714, e.g., by a smartphone application though the cloud-based service. If, however, it is determined that there is no exception in place, the monitor and control module will start at least one of a warning timer and a shutdown timer 707. The warning timer may be used to alert an authorized user that, in time, the appliance may be shut down while the shutdown timer may be used to alert an authorized user that, in time, the appliance has been shut down. Advantageously, before the appliance has been turned off, the monitor and control device may determine that the authorized radio-enabled component has come back into range 708. When this occurs, any active warning or shutdown timers may be reset 705 and the appliance may continue to operate and be used 702.

If, however, the monitor and control module does not detect that the authorized radio-enabled component is back in range 708, the monitor and control module is adapted to monitor the status of the warning timer and the shutdown timer that were started at step 707. More particularly, if the monitor and control module determines that the warning timer has reached or exceeded the set limit 709, but that the pre-determined shutdown time has not been reached, then the monitor and control module may generate and transmit a push notification warning 713, e.g., to the user's smartphone via the cloud-based service. Advantageously, upon receipt of a notification warning message, it would be possible for the user to create an exception 714, for example, that would add additional warning time and/or shutdown time or that would reset the timers altogether.

If, the monitor and control module determines that the shutdown time has been reached 710, the monitor and control module may be configured to generate and transmit a push notification shutdown message 713, e.g., to a user's smartphone via the cloud-based service. Whereas the first notification is a warning of impending shutdown, the second notification is a message of imminent shutdown. Simultaneously, or substantially simultaneously, after the shutdown time has been reached or exceeded 710, power, e.g., gas, electricity, and the like, may be disconnected 711 and the appliance is shut down 712, i.e. turned off. Advantageously, the steps described and the temporal occurrence of each may by recorded, in the database for further data processing and monetization.

It is understood that the various features, elements, methods or processes of the foregoing figures and descriptions are interchangeable or combinable to realize the implementations described herein. Aspects of the application can be practiced by other than the described implementations, which are presented for purposes of illustration rather than limitation, and the aspects are limited only by the claims which follow.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What we claim is:

1. A method of controlling an appliance, the method implemented by a device external to the appliance and the method comprising:
   determining that the appliance is consuming power using a sensor that is external to the appliance;
   obtaining a list of identifiers of authorized radio-enabled devices, wherein operation of the appliance depends on at least one of the authorized radio-enabled devices being proximate to the appliance;
   monitoring for presence of radio-enabled devices;
   determining that none of the authorized radio-enabled devices are proximate to the appliance by comparing identifiers of any proximate radio-enabled devices to the list of identifiers of authorized radio-enabled devices;
   starting a timer in response to determining that none of the authorized radio-enabled devices are proximate to the appliance;
   transmitting a notification to a user device; and
   causing the appliance to be disconnected from a power source in response to the timer reaching a limit.

2. The method of claim 1, wherein the appliance is selected from the group consisting of an electric-powered appliance, a natural gas-powered appliance, a geothermal-powered appliance, a solar-powered appliance, a gasoline-powered appliance, a diesel-powered appliance, a propane-powered appliance, and any combination thereof.

3. The method of claim 1, wherein the authorized radio-enabled devices comprise a dongle, a smartphone, a tablet computer, a personal digital assistant, a smartwatch, Google glasses, a laptop computer, a notebook computer, a fitness tracker, or a cellular telephone.

4. The method of claim 1 further comprising monitoring, by a third-party sensor, a condition proximate to the appliance.

5. The method of claim 1, wherein determining that none of the authorized radio-enabled devices are proximate to the appliance comprises determining that none of the authorized radio-enabled devices are within a pre-determined radius.

6. The method of claim 1, wherein transmitting the notification to the user device is based at least in part on a second timer reaching a second limit.

7. The method of claim 1, further comprising:
   receiving a usage exception from the user device; and
   in response to receiving the usage exception, resetting the timer or increasing the limit.

8. The method of claim 1 further comprising transmitting a notification to the user device that the appliance is in an on state.

9. The method of claim 1 further comprising transmitting a notification to the user device that the appliance has been disconnected from the power source.

10. The method of claim 1 further comprising:
    monitoring at least one sensor external to the appliance; and
    changing the operating state of the appliance using data received from the at least one sensor.

11. The method of claim 10, wherein the at least one sensor is a smoke alarm.

12. The method of claim 1 further comprising collecting data about the operating state of the appliance.

13. The method of claim 12 further comprising using the collected data to:
    calculate risk for insurance purposes;
    aggregate collected data for market intelligence;
    develop manufactured products;
    develop food products;
    provide market and sales data to utility companies;
    provide market and sales data to manufacturers; or provide market and sales data to insurance companies.

14. A device for controlling an appliance, the device comprising:
    a sensor that measures power consumption of the appliance;
    a control device to engage or disengage a power source from the appliance;
    a wireless communications port;
    at least one processor;
    at least one memory storing processor-executable instructions that, when executed by the at least one processor, cause the at least one processor to:
      determine that the appliance is consuming power using data obtained from the sensor,
      obtain a list of identifiers of authorized radio-enabled devices, wherein operation of the appliance depends on at least one of the authorized radio-enabled devices being proximate to the appliance;
      monitor for presence of radio-enabled devices,
      determine that none of the authorized radio-enabled devices are proximate to the appliance by comparing identifiers of any proximate radio-enabled devices to the list of identifiers of authorized radio-enabled devices;

start a timer in response to determining that none of the authorized radio-enabled devices are proximate, transmit a notification to a user device, and cause the appliance to be disconnected from the power source in response to the timer reaching a limit.

15. The device of claim 14, wherein the processor-executable instructions further cause the at least one processor to reset the timer in response to determining that an authorized radio-enabled device is proximate.

16. The device of claim 14, wherein the processor-executable instructions further cause the at least one processor to determine whether a usage exception is in place.

17. The device of claim 14, wherein the processor-executable instructions further cause the at least one processor to:

process a usage exception received from the user device, and reset the timer or increase the limit.

18. The device of claim 14, wherein:

the sensor comprises a voltage sensor, a current sensor, or a flow sensor, and the control device comprises an electrical switch or a valve.

19. The device of claim 14, wherein the processor-executable instructions further cause the at least one processor to:

start a second timer, and transmit the notification to the user device in response to the second timer reaching a second limit.

20. The device of claim 14, wherein the processor-executable instructions further cause the at least one processor to transmit a second notification to the user device after causing the appliance to be disconnected from the power source.

21. At least one non-transitory computer-readable medium comprising computer executable instructions that, when executed, cause one or more processors to perform actions comprising:

determining that an appliance is consuming power;

obtaining a list of identifiers of authorized radio-enabled devices, wherein operation of the appliance depends on at least one of the authorized radio-enabled devices being proximate to the appliance;

monitoring for presence of radio-enabled devices;

determining that none of the authorized radio-enabled devices are proximate to the appliance;

starting a timer in response to determining that none of the authorized radio-enabled devices are proximate to the appliance;

transmitting a notification to a user device; and causing the appliance to be disconnected from a power source in response to the timer reaching a limit.

22. The at least one non-transitory computer-readable medium of claim 21, the actions further comprising resetting the timer in response to determining that an authorized radio-enabled device is proximate to the appliance.

* * * * *